United States Patent
Olesen et al.

(10) Patent No.: US 8,781,403 B2
(45) Date of Patent: *Jul. 15, 2014

(54) SELF CALIBRATION METHOD FOR RADIO EQUIPMENT WITH RECEIVE AND TRANSMIT CIRCUITRY

(71) Applicant: Intel Mobile Communications GmbH, Neubiberg (DE)

(72) Inventors: Poul Olesen, Stoevring (DK); Jan Soerensen, Aalborg (DK)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,680

(22) Filed: Jun. 21, 2013

(65) Prior Publication Data

US 2013/0288616 A1    Oct. 31, 2013

Related U.S. Application Data

(63) Continuation of application No. 12/235,687, filed on Sep. 23, 2008, now Pat. No. 8,472,883.

(51) Int. Cl.
*H04B 17/00* (2006.01)
(52) U.S. Cl.
USPC .................................... 455/67.14; 455/67.11
(58) Field of Classification Search
USPC ........ 455/67.11, 67.13, 67.14, 423, 424, 425, 455/115.1–115.4, 226.1–226.4
See application file for complete search history.

(56) References Cited

U.S. PATENT DOCUMENTS

| | | | |
|---|---|---|---|
| 6,118,811 A | 9/2000 | Narumi et al. | |
| 6,671,844 B1 | 12/2003 | Krech, Jr. et al. | |
| 6,832,075 B1 | 12/2004 | Henry, Jr. | |
| 8,472,883 B2 * | 6/2013 | Olesen et al. | 455/67.14 |

OTHER PUBLICATIONS

Office Action dated Sep. 13, 2012 for U.S. Appl. No. 12/235,687.
Office Action dated Mar. 29, 2012 for U.S. Appl. No. 12/235,687.
Notice of Allowance dated May 22, 2013 for U.S. Appl. No. 12/235,687.

* cited by examiner

*Primary Examiner* — Eugene Yun
(74) *Attorney, Agent, or Firm* — Eschweiler & Associates, LLC

(57) ABSTRACT

A self-calibration circuit and associated method for testing an RF device includes the RF device to be tested having transmit and receive sections, and a built-in self test (BIST) circuit coupled to the transmit and receive sections of the RF device on the same chip. The self-calibration circuit is configured to calibrate the receive section of the RF device in a receive test mode, and calibrate the transmit section of the RF device in a subsequent transmit test mode using the calibrated receive section to measure a transmit output signal from the transmit section and to provide calibration data therefrom used in the transmit section calibration. The self-calibration circuit may include a duplex filter coupled between the transmit and receive sections and the BIST circuit, and a multiplexor coupled between the RF device, and the BIST circuit, configured to select one or more of a plurality of RF devices to be tested.

15 Claims, 2 Drawing Sheets

SELF CALIBRATION METHOD FOR RADIO EQUIPMENT WITH RECEIVE AND TRANSMIT CIRCUITRY

CROSS REFERENCE TO RELATED APPLICATIONS

This application is a Continuation of U.S. patent application Ser. No. 12/235,687 filed Sep. 23, 2008 in the name of Poul Olesen, et al., entitled "Self Calibration Method for Radio Equipment with Receive and Transmit Circuitry" and is hereby incorporated by reference.

BACKGROUND

In modern communications systems, the calibration and tuning of equipment containing RF circuitry normally requires expensive measurement and test equipment. In addition, the testing of RF circuitry can also require considerable time and slow the production flow. This expensive RF testing equipment is often controlled by additional external processing equipment such as a PC. Accordingly, all this external testing and processing equipment typically requires considerable communications and a corresponding lag time between the RF circuitry being tested, the measurement equipment and the PC. Such external testing equipment is also known as Automated Test Equipment (ATE).

One disadvantage of using such standard external test modes is that the test system must test the devices interactively. Consequently, only a limited number of devices can be tested at a given time, and a significant amount of overhead time is incurred due to tester limitations, for example, power up time is needed on certain pins while the mode is being accessed and while the tester is controlling the chip and checking the results. Further, the additional device pins that are to be accessed externally, typically need to be made large because of external connection requirements, and therefore occupy additional circuit/chip area.

Improvements in semiconductor processes, however, are making possible integrated circuits of increasing size and complexity. The semiconductor processing technologies that produce these integrated circuits have advanced to the point where complete systems, including RF circuits, can now be reduced to a single integrated circuit or application specific integrated circuit (ASIC) device. These integrated circuit "die" or "chips" may use many functions that previously could not be implemented on a single die.

If a device or circuit is embedded within an ASIC, built-in self-test (BIST) may be considered the most practical and efficient test methodology and is becoming increasingly popular with semiconductor manufacturers. BIST allows timely testing of the embedded device with a reasonably high degree of fault coverage, without requiring continual interactive (sequential) control via external test equipment.

BIST refers in general to any test structure and/or technique in which the testing algorithm or testing sequences (or test vectors) are generated internal to a device-under-test (DUT) such as a discrete device, an integrated circuit, or ASIC device. The testing algorithm used in BIST may be generally implemented in embedded circuitry of the device, wherein the test vectors are applied to the DUT to determine if the DUT is performing as designed. BIST can be used to test integrated circuits located anywhere on the device.

Unlike external testing approaches, at-speed testing utilizing BIST is readily achieved. BIST also alleviates the need for long and convoluted test vectors and may even function as a surrogate for functional testing. Since the BIST structures generally exist and remain active throughout the life of the device, BIST can be employed at the board or system level to reduce system testing costs, reduce device rejects during production, and to reduce field diagnostic costs. Alternately, BIST structures may be used at the wafer level or within the scribe line areas, which are then usually separated from the tested device.

Accordingly, there is a continued need to improve RF circuit testing and calibration methods utilizing faster and more cost-effective self-calibration circuits and methods.

SUMMARY

The following presents a simplified summary in order to provide a basic understanding of one or more aspects of the disclosure. This summary is not an extensive overview, and is neither intended to identify key or critical elements of the disclosure, nor to delineate the scope thereof. Rather, the primary purpose of the summary is to present some concepts in a simplified form as a prelude to the more detailed description that is presented later.

In one embodiment, a self-calibration circuit for testing an RF device is disclosed that includes the RF device to be tested having transmit and receive sections, and a built-in self test (GIST) circuit coupled to transmit and receive sections of the RF device on the same chip. The self-calibration circuit is configured to calibrate the receive section of the RF device in a receive test mode, and to calibrate the transmit section of the RF device in a subsequent transmit test mode using the calibrated receive section to measure a transmit output signal from the transmit section and to provide calibration data therefrom used in the calibration of the transmit section.

In one embodiment, a method is disclosed for self-calibrating an RF device having transmit and receive sections using a built-in self-test circuit to calibrate the receive section of the RF device in a receive test mode, and then using the calibrated receive section to measure a transmit output signal from the transmit section to provide calibration data for calibration of the transmit section in a transmit test mode. The method includes generating a first RF signal to an input of the receive section of the RF device in a receive test mode, and measuring an output of the receive section and calibrating the receive section based on the measurements. The method also includes generating a second RF signal in a transmit test mode, the second RF signal having a frequency equivalent to the duplex separation in the RF device. The method further includes transmitting a transmit output signal from the transmit section to the built-in self-test circuit, and mixing the transmit output signal with the second RF signal to generate a wanted signal equivalent to the nominal frequency of the receiver section. Finally, the method includes applying the wanted signal to the input of the receive section of the RF device, and measuring the wanted signal in the transmit test mode using the calibrated receive section to calibrate the transmit section based on the receive section measurements of the wanted signal.

The following description and annexed drawings set forth in detail certain illustrative aspects and implementations. These are indicative of only a few of the various ways in which the principles may be employed.

DETAILED DESCRIPTION

Figure 1:
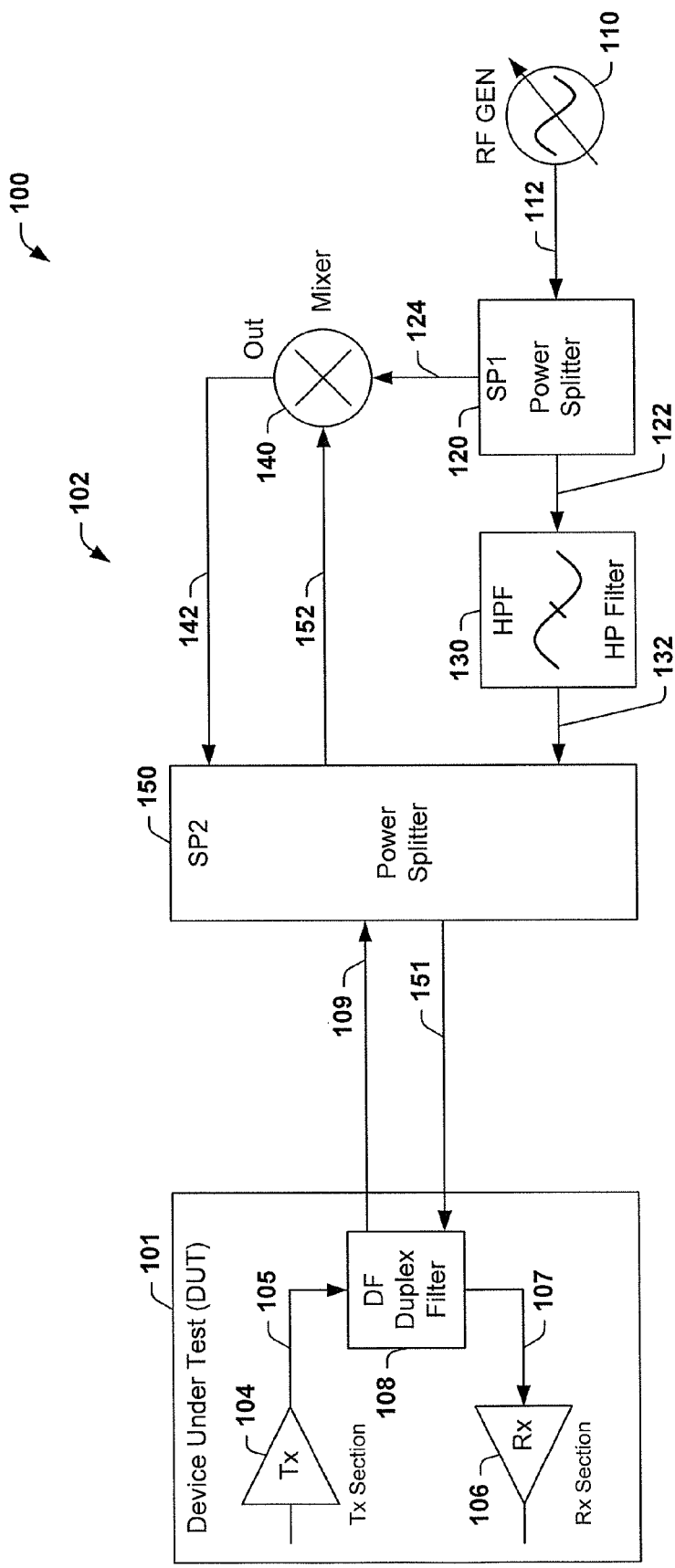
FIG. 1 is a simplified block diagram of a self-calibration circuit for testing and/or calibrating an RF device having transmit and receive sections in accordance with one embodiment of the disclosure.

One or more implementations will now be described with reference to the attached drawings, wherein like reference numerals are used to refer to like elements throughout. Systems and methods are disclosed for self-testing and/or calibration and/or tuning of one or more RF devices having transmit and receive sections, utilizing an on-chip built-in self test (BIST) circuit to calibrate the receive section of the RF device in a receive test mode, and to calibrate the transmit section of the RF device in a transmit test mode using the calibrated receive section.

Because the calibration and tuning of equipment containing RF circuitry normally requires expensive measurement and test equipment which also slows the production flow, embedded BIST circuits implemented on a single die with the device under test DUT, may be considered the most practical and efficient test/calibration methodology.

As indicated above, BIST generally refers to any test structure and/or technique in which the testing algorithm or testing sequences (or test vectors) are generated internal to a device under test (DUT) such as a discrete device, an integrated circuit, or ASIC device. The testing algorithm used in BIST can be implemented in embedded circuitry of the device to determine if the DUT is performing as designed. BIST can be used to test integrated circuits located anywhere on the device.

Unlike conventional external testing approaches, at-speed testing with BIST is readily achieved, and may also alleviate the need for long and convoluted test vectors and may provide for functional testing. Since the BIST structures generally exist and remain active throughout the life of the device, BIST can be employed at the board or system level to yield reduced system testing costs, reduce device rejects during production, and to reduce field diagnosis costs. Alternately, BIST structures may also be used at the wafer level or within the scribe line areas, which are subsequently separated from the DUT.

Accordingly, a self-calibration system and method for testing, calibration and tuning an RF circuit having both receive and transmit sections is provided in one embodiment utilizing a BIST circuit to first test and calibrate the receiver section, then to measure, test and calibrate the transmit section with the calibrated receive section. The RF self-calibration circuit is suitable for base and mobile station RF circuits and other applications where external calibration and tuning of RF transceiver circuits tends to be expensive and time consuming.

Turning now to FIG. 1, a simplified block diagram of a self-calibration circuit 100 for testing and/or calibrating and/or tuning an RF device 101 having transmit 104 and receive 106 sections in accordance with one embodiment of the disclosure.

In one embodiment, the self-calibration circuit 100 of FIG. 1 is used for testing a device such as RF device 101, also known as the device under test (DUT). The self-calibration circuit 100 includes the RF device to be tested 101 having transmit 104 and receive 106 sections, and a built-in self test (BIST) circuit 102 coupled to the transmit 104 and receive 106 sections of the RF device 101 on the same chip (not shown). The self-calibration circuit 100 is configured to calibrate the receive section 106 of the RF device as well as the receive path (via RX input signal 151) in the DF Duplex Filter 108 of the RF device 101 in a receive test mode, and to subsequently calibrate the transmit section 104 as well as the transmit path in the DF Duplex Filter 108 of the RF device 101 in a transmit test mode using the calibrated receive section 106 to measure a transmit output signal 109 from the transmit output 105 of the transmit section 104 and to provide calibration data therefrom, for example, useful in the subsequent calibration of the transmit section 104.

The Tx Output Signal 109 and the RX Input signal 151 can be combined in the same physical RF transmission line or coax cable. For example, 50 ohm RF connections are commonly used for this purpose.

The BIST circuit 102 of the self-calibration circuit 100 of FIG. 1, further comprises an RF signal generator 110 operable to generate an RF signal 112 to an Rx input 107 of the receive section 106 by way of a first power splitter SP1, 120 which provides a first RF signal 132, and a high-pass filter HPF 130. The High pass filter 130 provides isolation between the transmit output Tx output 105 of the transmit section 104 and the RF signal generator 110 of the BIST circuit 102, to suppress unwanted mixing products in the RF signal 112, and to generate a filtered RF signal 132.

The BIST circuit 102 of the self-calibration circuit 100 of FIG. 1, also includes a mixer 140 coupled to the RF signal generator 110 by way of RF signal 112, and the transmit Tx output 105 of the transmit section 104 and the Rx input 107 of the receive section 106. Mixer 140 is configured to generate a wanted signal 142 to the Rx input 107 of the receive section 106 equivalent to the nominal frequency of the receiver 106 by mixing the transmit output signal 109 with the RF signal 112 from the RF signal generator 110 tuned to a frequency equivalent to the duplex separation in the RF device 101 for the calibration of the transmit section 104 in the transmit test mode.

In another embodiment, the first power splitter SP1 120 is coupled between the signal generator 110 by way of RF signal 112, the high pass filter HPF 130 by way of first split RF signal 122, and the mixer 140 by way of second split RF signal 124, and is configured to split the RF power of RF signal 112 from the signal generator 110 between the high pass filter HPF 130 and the mixer 140, to isolate these functional blocks, and to suppress undesired mixing products. In one embodiment, the first power splitter SP1 120 may be a 3-port power splitter.

In one embodiment, the BIST circuit 102 of the self-calibration circuit 100 of FIG. 1, also includes a second power splitter SP2 150, such as a 4 or 5 port splitter, coupled between a mixer input 152 and a mixer output 142 of the mixer 140. Second power splitter SP2 150 is also coupled between the filtered RF signal 132 output from the high pass filter HPF 130, a transmit signal 109 from a duplex filter 108, and an Rx signal 151 to the duplex filter 108. The second power splitter SP2 150 is also configured to split various combinations of the power received from the SP2 input signals (e.g., 109, 132, 142) during transmit calibration/test or during receive calibration/test among the various SP2 output signals (e.g., 151, 152), and to isolate the respective functional blocks. The duplex filter 108 is coupled between the Tx output 105 of the transmit section 104 and the wanted signal 142 at the Rx input 107 of the receive section 106, and the BIST circuit 102.

In another embodiment, the transmit 104 and receive 106 sections of the self-calibration circuit 100 may also be configured to wirelessly transmit the transmit output signal 109 to the receive section 104. In another embodiment, the transmit section 104 and BIST circuit 102 of the self-calibration circuit 100 may be configured to wirelessly transmit the transmit output signal 109 to the mixer input 152 of the mixer 140.

In a receive calibration/test mode of the self-calibration circuit 100, the RF signal generator 110 is tuned to provide the filtered RF signal 132 to the receiver 106 at the nominal frequency of the receiver 106 for the calibration of the receive power level of the receiver 106. Mixer 140 can be disabled in this receive test mode to provide good RF isolation in the mixer 140 depending on the mixer design. TX section 104 is also disabled in this receive test mode. A low pass filter between Mixer 140 and Power splitter SP1 120 may also be utilized depending on the mixer 140 design used for the receive calibration. The isolation in the mixer 140 during receive calibration is the parameter that generally identifies this requirement, because low isolation may cause the signal path from RF GEN 110 to 120, 140 and 150 to have the same loss as the RF path from RF GEN 110 to 120, 130 and 150. In this receive test mode, the power of the RF signal 112 is split by the power splitter SP1 120 into the first split RF signal 122, received by the high-pass filter HPF 130. HPF 130 then provides a filtered RF signal 132 output based on the RF signal 112 and is also used to avoid unwanted mixing products during this calibration of the receiver.

During the receive calibration/test mode of the self-calibration circuit 100, only the signal path from RF GEN 110 via RF signal 112, to SP1 120 and First Split RF signal 122, to HPF 130 and Filtered RF signal 132, to SP2 150 and RX input signal 151 is used or active. All other RF signals in the self-calibration circuit 100 may be switched off or attenuated such that the receive calibration/test process is not disturbed. In principle, the power splitters (e.g., SP1 120 and SP2 150) can be replaced by switches. Thus, one advantage of the present invention is that devices 150, 130, 120 and 140 can all be implemented by use of passive components without requiring a power supply. Preferably, during receive calibration/test the wanted signal 142 and the Tx output signals are not used and are attenuated to low power levels such that they do not disturb the receive calibration/test by blocking or saturating the receiver 106. Thereafter, in the receive calibration/test mode of the self-calibration circuit 100, the receiver section 106 is then measured and the power measurement obtained is used to calibrate the receiver 106.

In a transmit test mode of the self-calibration circuit 100, the mixer 140 is used to generate the wanted signal 142 to the receiver 106 equivalent to the nominal frequency of the receiver 106, by mixing the transmit output signal 109 from the DUT 101 with the RF signal 112 from the RF signal generator 110 tuned to a frequency equivalent to the duplex separation or duplex distance (distance between up-link and down-link frequencies) in the DUT 101.

In one embodiment, the transmit output signal 109 may be transmitted from the transmit section 104 of the DUT 101, before being mixed in mixer 140 with the RF signal 112 from the RF signal generator 110 tuned to the frequency equivalent to the duplex separation in the DUT 101 in order to generate the wanted signal 142 equivalent to the nominal frequency of the receiver 106. In this way, a mixing product is produced in the mixer 140 which is within the bandwidth of the receiver 106 in the device under test 101. The receiver 106 can therefore be used to measure the signal level being transmitted (e.g., transmit output signal 109) and calibration data can be provided. The wanted signal 142 is then measured in the transmit test mode using the calibrated receive section 106, and the transmit section 104 is thereafter calibrated based on these measurements from the receive section 106.

Thus, the receive section 106 is first calibrated in the receive test mode, then the transmit section 104 is measured and calibrated using the measurements from the calibrated receive section 106.

Therefore, the self-calibration circuit 100 of FIG. 1 is configured to provide fast testing, calibration and/or tuning of the RF device under test 101 at a low cost, without external test and processing equipment, and without the usual considerable delays associated with interactive communications therebetween that tend to slow the flow of production. Instead, the proposed self-calibration circuit 100 deals relatively autonomously with the RF device under test 101.

Figure 2:
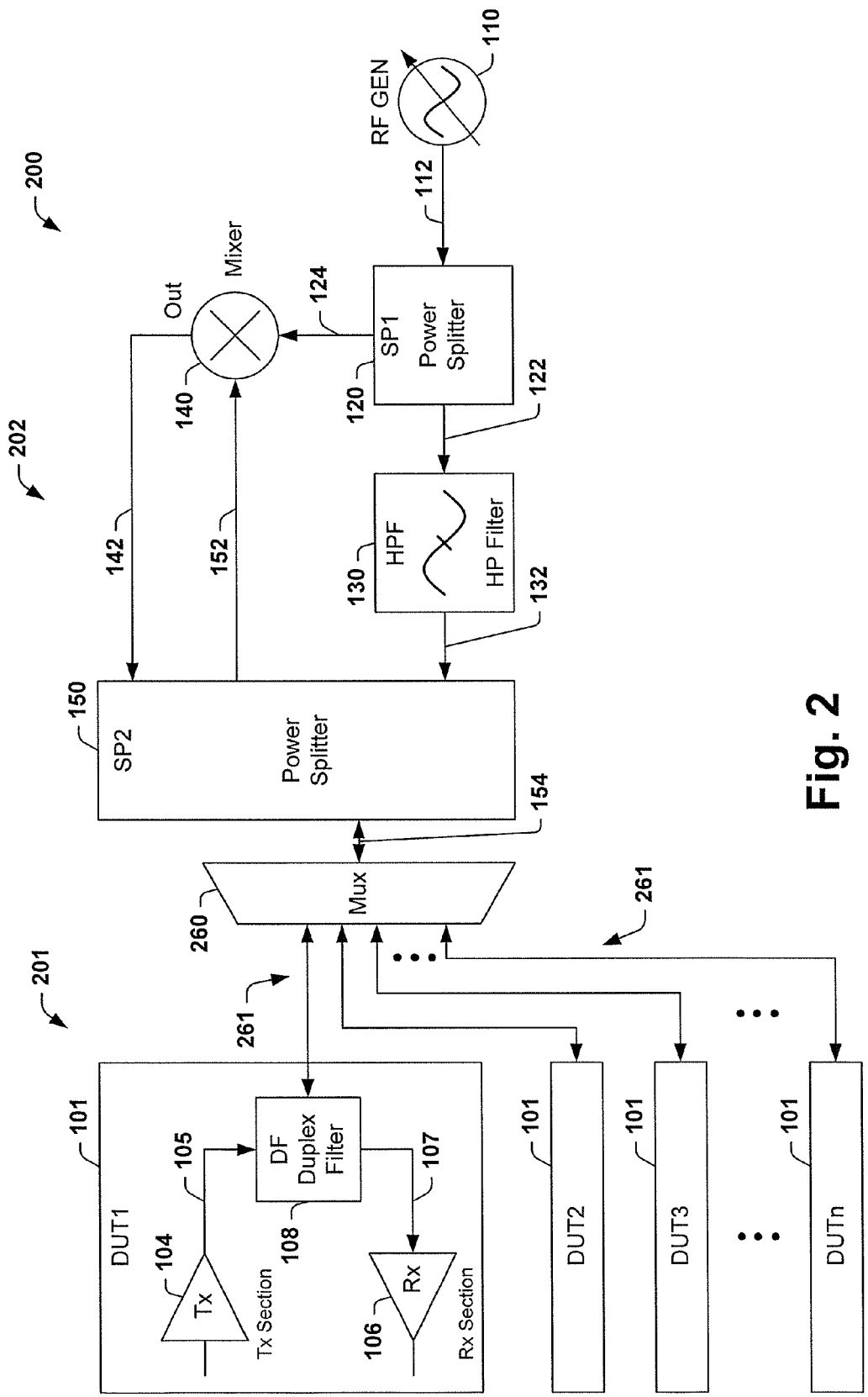
FIG. 2 is a simplified block diagram of a self-calibration circuit for testing and/or calibrating and/or tuning one or more RF devices of a plurality of RF devices having transmit and receive sections in accordance with one embodiment of the disclosure.

FIG. 2 illustrates a simplified block diagram of a self-calibration circuit 200 for testing and/or calibrating and/or tuning one or more RF devices 101 of a plurality of RF devices 201 each having a transmit 104 and receive 106 section in accordance with another embodiment of the disclosure.

Self-calibration circuit 200 of FIG. 2 is similar to that of self-calibration circuit 100 of FIG. 1, and as such need not be fully described again, except where noted, for the sake of brevity.

In one embodiment, the self-calibration circuit 200 of FIG. 2 is used for testing one or more RF devices or DUTs 101 (e.g., DUT1, DUT2, DUT3 . . . DUTn) of a plurality of RF devices 201. The self-calibration circuit 200 includes the one or more RF devices to be tested 101 of the plurality of RF devices 201, each having transmit 104 and receive 106 sections, and a built-in self test (BIST) circuit 202 coupled to the transmit 104 and receive 106 sections of the one or more RF devices 101 on the same chip (not shown). The self-calibration circuit 200 is configured to calibrate the receive section 106 of the RF devices 101 in a receive test mode, and to subsequently calibrate the transmit section 104 of the RF devices 101 in a transmit test mode using the calibrated receive section 106 to measure a transmit output signal 109 from the transmit section 104 and to provide calibration data therefrom, for example, useful in the calibration of the transmit section 104.

Self-calibration circuit 200 of FIG. 2, further comprises a select switch or multiplexor 260 coupled between the duplex filters DF 108 of the RF devices 101, and the BIST circuit 202. Multiplexor 260 is configured to select one or more of the plurality of RF devices 201 to be tested by BIST circuit 202, by selecting and coupling one or more of a plurality of Tx/Rx signals 261 by way of mux line 154 to the second power splitter SP2 of self-calibration circuit 200.

Self-calibration circuit 200 of FIG. 2 is therefore configured, for example, for sequentially or simultaneously testing one or more RF devices 101 using a single BIST circuit 202. In another embodiment, one or more BIST circuits 202 may be utilized for sequentially or simultaneously testing one or more RF devices 101.

In another embodiment, the RF device(s) 101 may utilize one of a UMTS, CDMA, WDCMA, GSM and 3GSM standard.

Although a BIST circuit 102 or 202 is illustrated and discussed herein, which may include some or all of the illustrated components, it will also be appreciated by those skilled in the art that one or more of the components or circuits shown in the self-calibration circuits 100 of FIG. 1 and 200 of FIG. 2 may be provided external to the chip upon which the RF device(s) 101 resides, and as such is also contemplated. For example, the RF generator 110 may be provided off-chip, either externally or within a wafer scribe line, while the remaining illustrated components are resident on the same die/chip.

While the self-calibration circuits 100 and 200 are described herein with one or more identified filters, duplex (DF) or high-pass filters (HPF), power splitters or dividers, mixers, RF generators or digitally controlled oscillators (DCO), amplifiers, transmit and receive or transceiver sections, BIST circuits and structures, as one example, it should be understood that many variations of such components and features can be made, and all such variations are contemplated as falling within the scope of the disclosure. Such self calibration, testing and tuning can also be carried out by other means also contemplated within the scope of the disclosure.

Alternately, the testing and/or calibration of the transmit and receive sections of the tested RF devices can be accomplished in one of an open loop mode wherein a user selects from among a plurality of BIST testing algorithms or test sequences, a closed loop mode wherein the BIST circuit selects from among a plurality of BIST testing algorithms or test sequences to be accomplished, a closed loop mode wherein the BIST circuit runs one or more predetermined tests, or any other combination of open and closed loop modes, and all such variations and combinations of the aforementioned are contemplated herein.

By contrast to prior art systems, the self-calibration circuits 100 of FIG. 1 and 200 of FIG. 2, achieve improved performance, testing reliability, speed and production flow, at a reduced system cost.

In addition to or in substitution of one or more of the illustrated components, the illustrated one or more filters, duplex or high-pass filters (HPF), power splitters or dividers, mixers, RF generators or digitally controlled oscillators (DCO), amplifiers, transmit and receive or transceiver sections, BIST circuits and structures, and other systems of the disclosure may include suitable circuitry, state machines, firmware, software, logic, etc. to perform the various methods and functions illustrated and described herein, including but not limited to the method(s) described below.

In one embodiment, a method is disclosed for self-calibrating an RF device (e.g., RF device/DUT 101 of FIGS. 1 and 2) having transmit and receive sections (e.g., Tx 104 and Rx 106 of FIGS. 1 and 2) using a built-in self-test circuit (e.g., 102 of FIG. 1 or 202 of FIG. 2) to calibrate the receive section 106 of the RF device 101 in a receive test mode, and then using the calibrated receive section 106 to measure a transmit output signal (e.g., 109 of FIG. 1 or 261 of FIG. 2) from the transmit section 104 to provide calibration data for calibration of the transmit section 104 in a transmit test mode.

The method includes generating a first RF signal (e.g., 132 of FIGS. 1 and 2) to an Rx input 107 of the receive section 106 of the RF device 101 in a receive test mode, measuring the Rx output of the receive section 106 and calibrating the receive section 106 based on the measurements obtained. The method also includes generating a second RF signal (e.g., 124 of FIGS. 1 and 2) in a transmit test mode, the second RF signal having a frequency equivalent to the duplex separation in the RF device 101.

The method further includes transmitting (e.g., 109 of FIGS. 1 and 2) a transmit output signal (e.g., 109 of FIG. 1 or 261 of FIG. 2) from the transmit section 104 to the built-in self-test circuit (e.g., 102 of FIG. 1 or 202 of FIG. 2), and mixing (e.g., using 140 of FIGS. 1 and 2) the transmit output signal (e.g., 109 of FIG. 1 or 261 of FIG. 2) with the second RF signal (e.g., 124 of FIGS. 1 and 2) to generate a wanted signal (e.g., 142 of FIGS. 1 and 2) equivalent to the nominal frequency of the receiver section 106.

Finally, the method includes applying the wanted signal (e.g., 142 of FIGS. 1 and 2) to the Rx input 107 of the receive section 106 of the RF device 101, and measuring the wanted signal (e.g., 142 of FIGS. 1 and 2) in the transmit test mode using the calibrated receive section 106 to calibrate the transmit section 104 based on the receive section measurements of the wanted signal (e.g., 142 of FIGS. 1 and 2).

In another embodiment, the method further comprises filtering (e.g., using high-pass HP filter 130 of FIGS. 1 and 2) the first and second RF signals (e.g., 132 of FIGS. 1 and 124 of FIG. 2, respectively) to provide isolation between the transmit section 104 and the built-in self-test circuit (e.g., 102 of FIG. 1 or 202 of FIG. 2), and to suppress unwanted mixing products in the first and second RF signals.

Therefore, the inventors have appreciated that the transmit and receive sections of an RF device may be tested and/or calibrated using on-chip BIST circuit structures and methods by first calibrating the receive section to an RF generator in a receive test mode, and then testing/calibrating the transmit section using measurements obtained from the calibrated receive section in a transmit test mode. One example is to use the receiver in one DUT to calibrate the transmitter in one of the other DUT's depending on the frequency plan for the whole system. For DUT's where simultaneous transmit and receive is not possible (some GSM RF solutions) this option is relevant. The Mux 260 and the power splitter 150 may in such architecture be replaced with a combined RF switch/Mux.

Although the disclosure has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for self-calibrating an RF device having transmit and receive sections, comprising:
   using a built-in self-test circuit to calibrate the receive section of the RF device in a receive test mode; and
   using the calibrated receive section to measure a transmit output signal from the transmit section to provide calibration data for calibration of the transmit section in a transmit test mode.

2. The method of claim 1, wherein calibrating the receive section comprises generating a first RF signal and providing the generated first RF signal to an input of the receive section in the receive test mode.

3. The method of claim 2, further comprising filtering the generated first RF signal prior to being provided to the input of the receive section.

4. The method of claim 2, wherein calibrating the receive section further comprises measuring an output of the receive section as a function of the generated first RF signal provided to the receive section and using the measurements to calibrate the receive section.

5. The method of claim 1, wherein calibration of the transmit section comprises:
   transmitting a transmit output signal from the transmit section to the built-in self-test circuit;
   generating a wanted signal based on the transmit output signal in the built-in self-test circuit;
   applying the wanted signal to the input of the calibrated receive section; and
   using a received wanted signal at an output of the calibrated receive section to calibrate the transmit section.

6. The method of claim 5, wherein generating the wanted signal comprises:
   mixing the transmit output signal with a generated second RF signal, wherein the resultant wanted signal has a frequency equivalent to a nominal frequency of the receiver section.

7. The method of claim 1, wherein calibration of the transmit section comprises:
   generating a second RF signal in the transmit test mode;
   transmitting a transmit output signal from the transmit section to the built-in self-test circuit;
   mixing the transmit output signal with the second RF signal to generate a wanted signal;
   applying the wanted signal to the input of the calibrated receive section;
   measuring the received wanted signal in the transmit test mode using the calibrated receive section; and
   using the calibrated receive section measurements of the wanted signal to calibrate the transmit section.

8. The method of claim 7, wherein generating the second RF signal comprises:
   generating an RF signal; and
   splitting the generated RF signal into the first RF signal and the second RF signal.

9. The method of claim 8, wherein the splitting of the generated RF signal is performed with a power splitter.

10. The method of claim 8, further comprising high pass filtering the first RF signal, and using the filtered first RF signal in calibrating the receive section.

11. A method for self-calibrating an RF device having transmit and receive sections using a built-in self-test circuit to calibrate the receive section of the RF device in a receive test mode and then using the calibrated receive section to measure a transmit output signal from the transmit section to provide calibration data for calibration of the transmit section in a transmit test mode, the method comprising:
   providing a first RF signal to an input of the receive section of the RF device in the receive test mode;
   measuring an output of the receive section based on the RF signal input thereto and calibrating the receive section based on the measurements;
   providing a second RF signal in a transmit test mode;
   transmitting a transmit output signal from the transmit section to the built-in self-test circuit;
   employing the transmit output signal and the second RF signal to generate a wanted signal;
   applying the wanted signal to the input of the receive section of the RF device, wherein the output of the receive section comprises a received wanted signal; and
   measuring the received wanted signal in the transmit test mode using the calibrated receive section to calibrate the transmit section based on the receive section measurements of the received wanted signal.

12. The method of claim 11, comprising filtering at least the first RF signal to provide isolation between the transmit section and the built-in self-test circuit, and to suppress unwanted mixing products in the first and second RF signals.

13. The method of claim 11, wherein employing the transmit output signal and the second RF signal comprises:
   mixing the transmit output signal with the second RF signal to generate the wanted signal, wherein the wanted signal has a frequency that corresponds to a nominal frequency of the receiver section.

14. The method of claim 11, wherein providing the first and second RF signals comprises:
   providing an RF signal; and
   splitting the RF signal into the first RF signal and the second RF signal.

15. The method of claim 14, wherein the splitting is performed with a power splitter.

* * * * *